United States Patent
Legallais et al.

(10) Patent No.: US 7,451,868 B2
(45) Date of Patent: Nov. 18, 2008

(54) CONVEYOR DEVICE WITH AN IMPROVED TRANSFER ARM

(75) Inventors: Stéphane Legallais, Octeville sur Mer (FR); Vincent Brachet, Octeville sur Mer (FR); Denis Gillet, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 10/591,400

(22) PCT Filed: Feb. 7, 2005

(86) PCT No.: PCT/EP2005/050499

§ 371 (c)(1),
(2), (4) Date: Jun. 18, 2007

(87) PCT Pub. No.: WO2005/095238

PCT Pub. Date: Oct. 13, 2005

(65) Prior Publication Data

US 2007/0256911 A1  Nov. 8, 2007

(30) Foreign Application Priority Data

Mar. 5, 2004 (FR) .................................. 04 50454

(51) Int. Cl.
B65G 25/00 (2006.01)

(52) U.S. Cl. ............... 198/470.1; 198/476.1; 198/478.1

(58) Field of Classification Search .............. 198/470.1, 198/471.1, 474.1, 475.1, 476.1, 478.1
See application file for complete search history.

(56) References Cited

U.S. PATENT DOCUMENTS

| | | | | |
|---|---|---|---|---|
| 4,178,659 A * | 12/1979 | Simonds | .................. | 198/478.1 |
| 4,458,804 A * | 7/1984 | Williams et al. | ......... | 198/478.1 |
| 5,607,045 A * | 3/1997 | Hermann Kronseder | . | 198/476.1 |
| 6,015,040 A * | 1/2000 | Goeb et al. | ............. | 198/476.1 |
| 6,672,446 B2 * | 1/2004 | Boldrini et al. | ......... | 198/471.1 |
| 2005/0011730 A1 * | 1/2005 | Wittmann et al. | ........ | 198/470.1 |

FOREIGN PATENT DOCUMENTS

FR  2 802 191  6/2001

\* cited by examiner

*Primary Examiner*—James R Bidwell
(74) *Attorney, Agent, or Firm*—Young & Thompson

(57) ABSTRACT

Device for conveying objects, includes a rotating support having a transfer arm which consists of a plate and a gripper head which can bear at least one object and which is slidingly mounted in relation to the plate according to a direction. The gripper head (20) is coupled to a slider sliding in a slide rail fixed to the plate, and including a first and second cam system in order to respectively slidingly drive the gripper head and to pivotingly drive the plate, according to the angular position of the arm around the axis of rotation of the support. The slider is constructed as a single part which has an overall rail shape, and the profile of the slider is complementary with respect to the profile of the slide rail. The gripper head is fixed such that it overhangs on the distal end section of the slider.

13 Claims, 3 Drawing Sheets

CONVEYOR DEVICE WITH AN IMPROVED TRANSFER ARM

The present invention relates to a device for conveying objects.

The present invention relates more particularly to a device for conveying objects such as preforms and bottles, of the type comprising a rotating support which is driven in rotation continuously about a substantially vertical axis of rotation and which carries a transfer arm, of the type in which the transfer arm comprises a supporting element which is mounted in a swivelling manner with respect to the rotating support, about a swivelling spindle which is substantially parallel to the axis of rotation of the support, and a grasping head which is able to support at last one object and which is mounted in a sliding manner with respect to the supporting element, in a direction approximately radial with respect to the axis of rotation of the support, between a proximal retracted position and a distal extended position with respect to the axis of rotation, of the type in which the grasping head is attached to a slider sliding in a slide fixed on the supporting element, and of the type comprising a first cam system and a second cam system for driving the grasping head in its sliding and the supporting element in its swivelling respectively, according to the angular position of the arm about the axis of rotation of the support.

Conveying devices of this type are found in container blowing machines in which the container is obtained by blowing by inserting a preform previously produced by injection moulding into a blowing mould. These machines are for example used for the manufacture of bottles made of polyethylene terephthalate (PET).

The preform has the shape of a tube which is closed at one end and whose other end already has the definitive shape of the neck of the container.

The preform is therefore placed inside the mould after having been brought to an appropriate temperature in a heat conditioning oven. Once blown, each container is removed from the mould to be taken to the output of the machine.

Many container-blowing machines are of the rotary type. They therefore comprise a carrousel which rotates continuously about its axis and which carries, at its periphery, a series of identical moulds.

Conveying devices with a transfer arm therefore make it possible, on the one hand, to introduce preforms into the moulds and, on the other hand, to withdraw the containers once formed, to and to do this without having to stop the carrousel. The transfer arms, because of their extension and retraction capabilities on the one hand and their capability of accelerating or slowing down the head by means of swivelling on the other hand, make it possible to avoid any interference between the moulds and the conveyed objects.

A conveying device of this type is described and shown in the document WO-A-01/44084.

This device, even though it has been satisfactory, has certain limitations however, in particular when it is made to operate at high rates. The transfer arm can then prove to be relatively bulky and heavy, which results in high inertia during movements.

The purpose of the invention is, in particular, to overcome these disadvantages by proposing a conveying device comprising at least one more compact and lighter transfer arm.

For this purpose, the invention proposes a conveying device of the type previously described, characterized in that the slider is produced in one piece with the overall shape of a rail, the profile of the slider being complementary to the profile of the slide, and in that the grasping head is fixed in a cantilevered manner to the distal end section of the slider.

According to other features of the invention:

the first cam system comprises a first cam follower element which is fixed to the distal end section of the slider;

the first cam follower element is a roller called the extension roller which is mounted freely rotating on a roller spindle substantially parallel with the axis of rotation of the support, and the roller spindle is fixed on the distal end section of the slider through a portion of the grasping head, in such a way as to constitute a means of fixing the grasping head on the slider;

the transfer arm comprises a return device which is interposed totally along the extension axis between the distal end section of the slider and the supporting element in such a way as to return the grasping head to its retracted position;

the distal end of the return device is fixed on the spindle carrying the extension roller;

the supporting element comprises a main body which is provided with a swivelling leg carrying at least one cam follower element which is part of the second cam system, and the proximal end of the return device is fixed on the swivelling leg;

the return device is a spiral draw-spring which extends entirely under the lower face of the slider;

the grasping head comprises a lug for fixing it to the distal end transverse face of the slider and a fixing screw which is screwed into the distal end transverse face of the slider through the lug;

the proximal end section of the slider comprises a stop which is able to cooperate with an associated surface of the supporting element for determining the maximum extension travel of the grasping head;

the supporting element comprises a ball bearing which receives the lower axial end of the swivelling spindle such that the supporting element is mounted freely rotating about the swivelling spindle;

the swivelling spindle comprises a threaded intermediate section which is screwed into a spacer fixed to the rotating support to allow height adjustment of the supporting element with respect to the rotating support and means of locking the swivelling spindle in an adjusted position with respect to the spacer;

the upper axial end of the swivelling spindle comprises a means of driving the swivelling spindle in rotation for the purpose of adjusting the height of the supporting element.

Other features and advantages of the invention will appear on reading the following detailed description, for the understanding of which reference is made to the appended drawings in which:

In the following description, identical, similar or analogous elements will be denoted by the same reference numbers.

FIG. 1 shows a conveying device 10 of the type of those that can be found in machines for manufacturing containers made of PET by blowing preforms, the preforms being previously obtained by injection moulding and then being heated above the vitreous transition temperature of PET before being successively introduced into blowing moulds.

The conveying device 10 can be used in particular for conveying the preforms or for conveying the containers.

The conveying device 10 comprises a rotating support 12 which in this case is made in the form of a turntable and which is driven in rotation continuously about a vertical axis of rotation AO.

Figure 1:
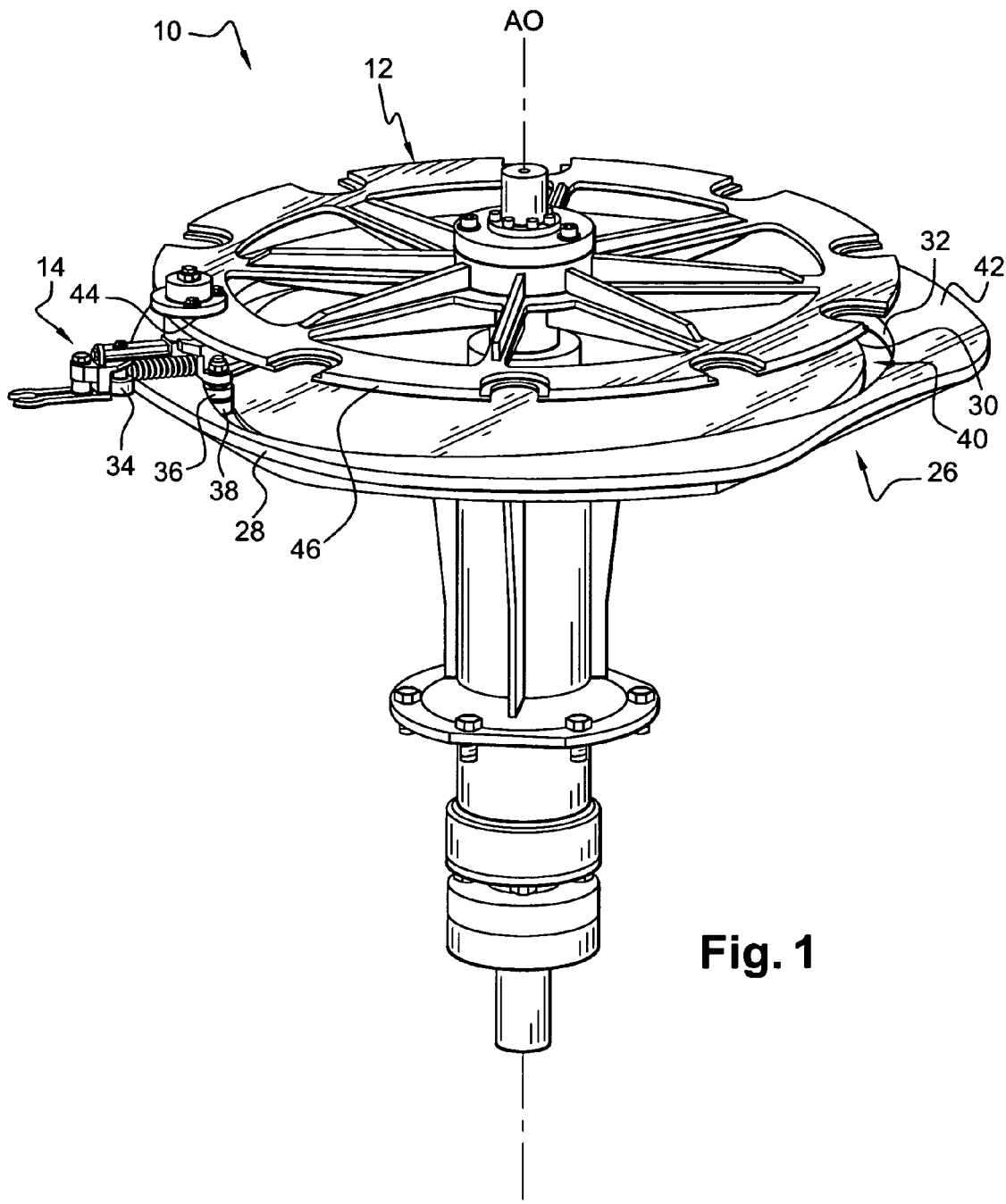
FIG. 1 is a perspective view which diagrammatically shows a conveying device equipped with a transfer arm produced according to the disclosures of the invention.

The support 12 carries one or more transfer arms 14, just one being shown in FIG. 1 in order to simplify the representation.

Figure 2:
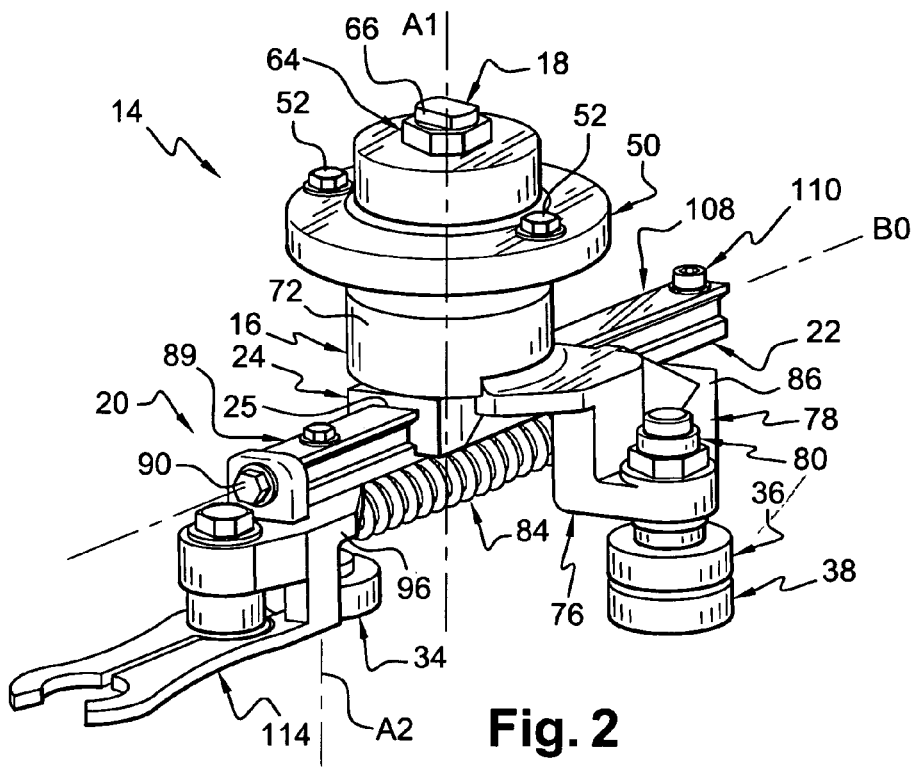
FIG. 2 is a perspective view which diagrammatically shows the transfer arm of FIG. 1 in the retracted position.
Figure 3:
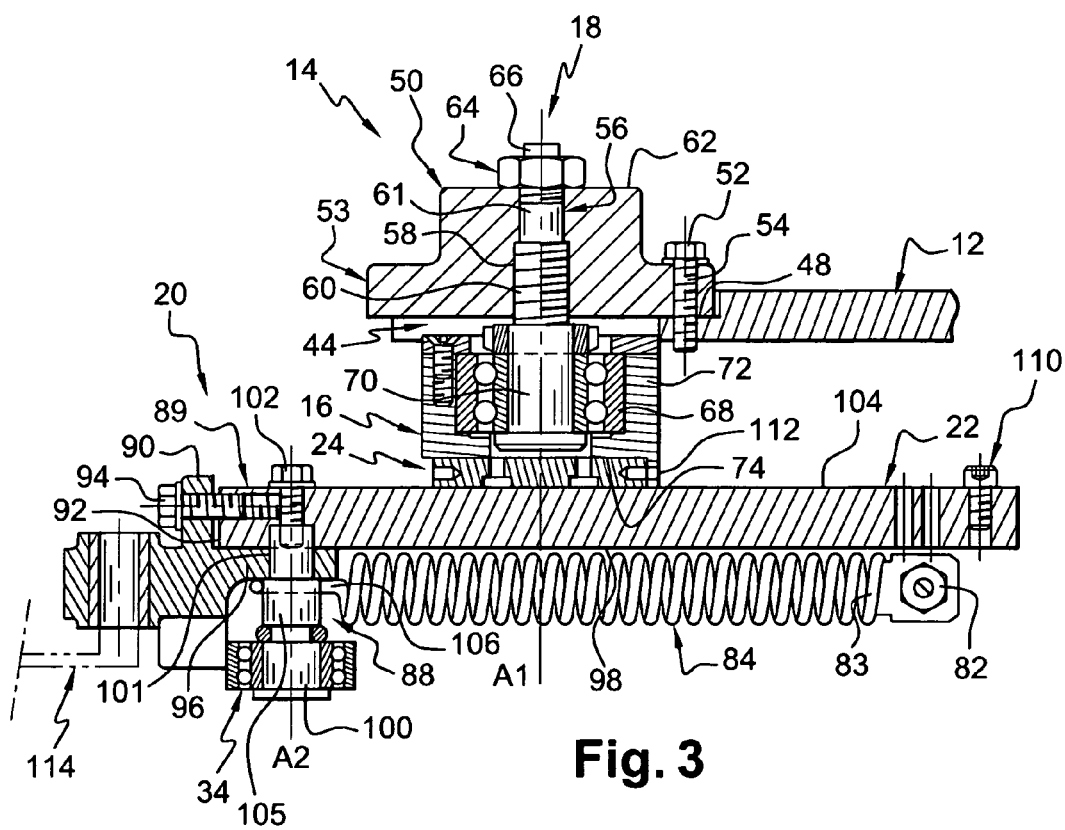
FIG. 3 is a cross-sectional view through the plane 3-3, which diagrammatically shows the transfer arm of FIG. 1 in the retracted position.

As can be seen in FIGS. 2 and 3, the transfer arm 14 comprises a supporting element 16 which is mounted such that it pivots with respect to the support 12, about a swivelling spindle 18 having an axis A1 substantially parallel with the axis of rotation AO of the support 12.

The transfer arm 14 also comprises a grasping head 20 which is able to support at least one preform or one container (not shown) and which is mounted such that it slides with respect to the supporting element 16, in a direction BO approximately radial with respect to the axis of rotation AO of the support 12, between a proximal retracted position and a distal extended position, with respect to the axis of rotation AO.

In the rest of the description, the terms "distal" and "proximal" will be used in a non-limiting manner to describe elements of the transfer arm 14 according to their proximity to the axis of rotation AO of the support 12.

Figure 4:
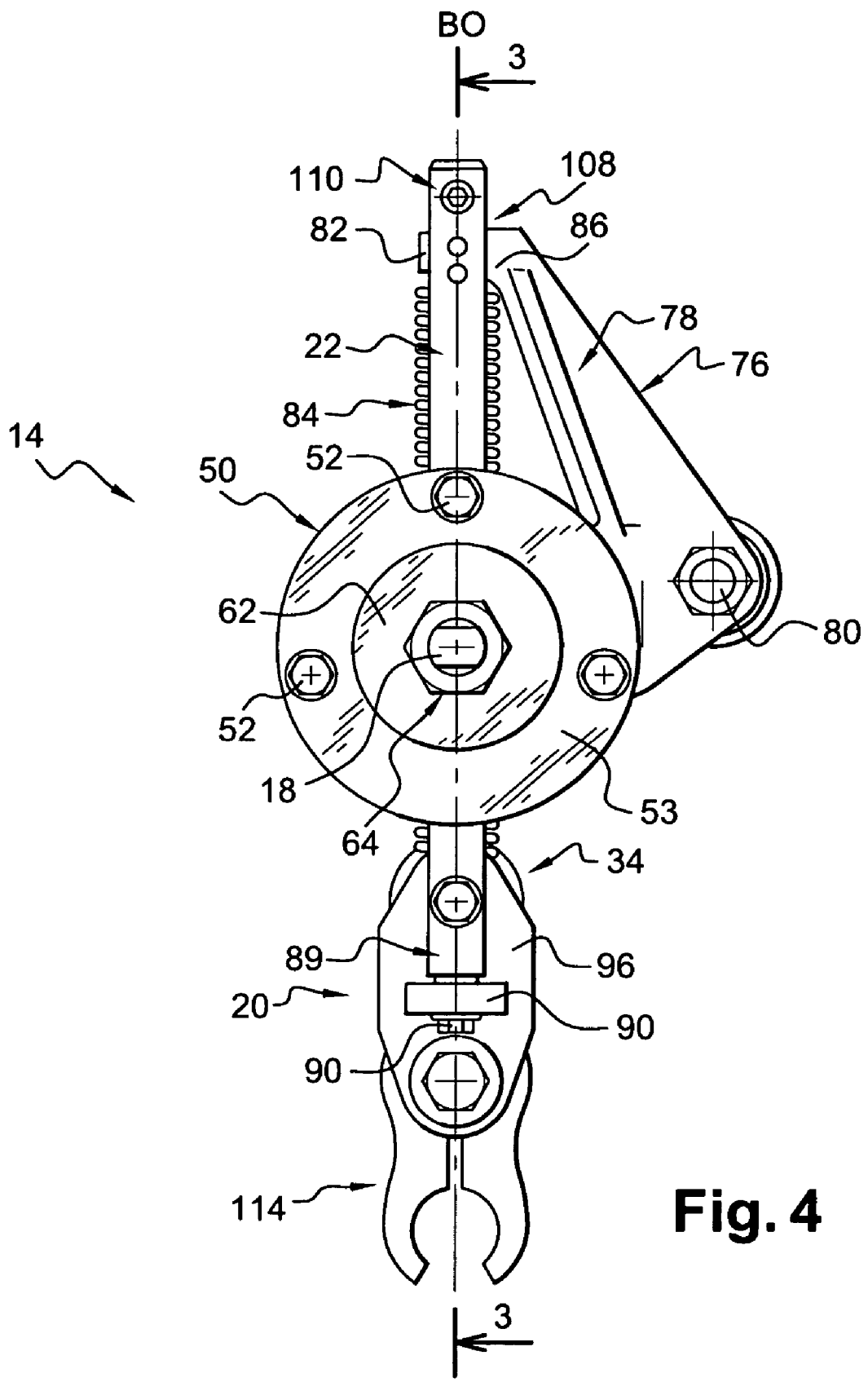
FIG. 4 is a plan view which diagrammatically shows the transfer arm of FIG. 1 in the retracted position.

In FIG. 1, the grasping head 20 is shown in the extended position and in FIGS. 2, 3 and 4 the grasping head 20 is shown in the retracted position.

The grasping head 20 is attached to a slider 22 produced in one piece with the overall shape of a rail which is mounted such that it slides in a slide 24 fixed to the supporting element 16.

The groove 25 of the slide 24 has an adapted shape, in this case T-shaped, in transverse cross-section with respect to the direction BO, and the groove 25 is open towards the arm.

The profile of the slider 22 is complementary to the profile of the groove 25 of the slide 24 such that the slider 22 is held vertically downwards by the slide 24 and its adapted profile.

The slider 22 is therefore constituted by a metal T profile, in transverse cross-section with respect to the direction of sliding BO, and the slider 22 is held vertically in the slide 24 by the horizontal branches of the "T".

It is noted that the slider 22 and the slide 24 can be produced easily by machining.

In a known way, the conveying device 10 comprises a first cam system and a second cam system for driving the grasping head 20 in sliding and the supporting element 16 in swivelling respectively, according to the angular position of the transfer arm 14 about the axis of rotation AO of the support 12.

For this purpose, the conveying device 10 comprises a fixed table 26 which is arranged coaxially under the support 12 and which is provided with cam tracks 28, 30, 32, or control surfaces, provided for cooperating with the associated cam follower elements 34, 36, 38 carried by the slider 22 and the supporting element 16.

According to the embodiment shown here, the first cam system is constituted by a loose roller 34 called the extension roller, having a vertical axis A2, which is carried by the slider 22 and which travels a cam track 28 formed on an external peripheral axial face of the table 26.

The second cam system is here constituted by two loose rollers 36, 38, called swivelling rollers, which are superimposed and coaxial with the vertical axis, which are carried by the supporting element 16, and which travel cam tracks 30, 32 formed on the internal axial walls of a groove 40 formed in the transverse upper face 42 of the table 26.

According to the embodiment shown here, the transfer arm 14 is received in a complementary housing 44 formed in the support 12. This housing 44 here has the shape of a circular hole open on the side of the external peripheral edge 46 of the support 12.

The housing 44 comprises a shoulder which delimits an upper transverse bearing surface 48.

A spacer 50 forming a pedestal is fixed on the transverse bearing surface 48 of the housing 44, in this case by means of three vertical fixing screws 52 which are screwed in associated holes formed in the transverse bearing surface 48.

The spacer 50 has the overall shape of a vertical supporting element provided, at its lower axial end, with an external radial collar 53 which comprises three axial holes 54 for the passage of the fixing screws 52 of the spacer 50.

The spacer 50 comprises a central axial hole 56 whose lower section 58 is tapped. The swivelling spindle 18 comprises an intermediate threaded section 60 whose thread is complementary to the tapping of the lower section 58 of the swivelling spindle 18.

By this arrangement, the pivoting spindle 18 is fixed on the support 12 by the intermediary of the spacer 50, the intermediate section 60 of the swivelling spindle 18 being screwed into the lower tapped section 58 of the spacer 50.

The upper axial section 61 of the swivelling spindle 18 also comprises a thread, which is provided such that it extends axially above the upper end transverse face 62 of the spacer 50, such that it can receive locking means 64, for example a nut which bears axially against the upper end transverse face 62.

Advantageously, the upper end of the upper axial section of the swivelling spindle 18 comprises a means 66 of driving in rotation to allow the height adjustment of the swivelling spindle 18. This drive means 66 here consists of two diametrically opposed flats, which are formed on the upper axial end of the swivelling spindle 18.

According to the embodiment shown here, the supporting element 16 comprises a ball bearing 68 which receives the lower axial end section 70 of the swivelling spindle 18 such that the supporting element 16 is mounted such that it can rotate freely about the swivelling spindle 18 and such that the supporting element 16 is immobile in axial translation with respect to the swivelling spindle 18.

The supporting element 16 here comprises a main cylindrical body 72 coaxial with the swivelling spindle 18.

The slide 24 is fixed onto the lower transverse face 74 of the main body 72.

The main body 72 of the supporting element 16 is provided, over an angular sector, with a leg 76, called the swivelling leg, which extends laterally with respect to the slide 24 and downwards with respect to the main body 72.

The swivelling leg 76 comprises a transverse plate 78 which supports the swivelling rollers 36, 38 of the second cam system, for the purpose of driving the supporting element 16 to swivel about its swivelling axis A1.

The swivelling rollers 36, 38 are mounted such that they rotate freely on the lower end section of a spindle 80 parallel with the swivelling axis A1 of the supporting element 16.

The transverse plate 78 comprises an anchoring pin 82 for the proximal end 83 of a return device 84 which is interposed axially, in the sliding direction BO of the head with respect to the supporting element, between the slider 22 and the supporting element 16, in such a way as to return the grasping head 20 towards its retracted position by pressing the extension roller 34 against its cam track 28.

The shape of the transverse plate 78 is particularly visible in FIG. 4.

The transverse plate 78 comprises an extension 86 which allows the anchoring pin 82 to be contained, with the attachment point 88 of the return device 84 on the slider 22, in a vertical plane passing through the sliding direction BO of the head with respect to the supporting element.

According to the disclosures of the invention, the slider 22 is produced in one piece with the overall shape of a rail, the profile of the slider being complementary to the profile of the slide 24, and the grasping head 20 is fixed cantilevered on the distal end section 89 of the slider 22.

The grasping head 20 here comprises an end lug 90 for its fixing on the distal transverse end face 92 of the slider 22.

The end lug 90 extends in an overall manner in a plane transverse to the sliding direction BO of the head with respect to the supporting element.

A fixing screw 94 is screwed into the distal transverse end face 92 of the slider 22, through the end lug 90, in the sliding direction BO of the head with respect to the supporting element.

The grasping head 20 comprises a lower lug 96 which extends in an overall manner in a plane transverse to the swivelling axis A1 and which is provided for fixing the grasping head 20 on the lower face 98 of the slider 22.

The extension roller 34 is mounted such that it rotates freely on the lower end section of a spindle 100, also called a roller spindle 100, substantially parallel with the axis of rotation AO of the support 12.

The roller spindle 100 is fixed on the lower face 98 of the distal end section 89 of the slider 22, through a vertical hole 101 formed in the lower lug 96 of the grasping head 20.

The distal end section 89 of the slider 22 comprises a vertical fixing screw 102 which is fitted in the upper face 104 of the slider 22 and which is screwed in the upper axial end section of the roller spindle 100.

The roller spindle 100 here comprises a spacer 105 which is interposed along the axis A2 between the lower transverse face of the lower lug 96 and the extension roller 34, such that the lower lug 96 is clamped axially (A2) between the spacer 105 and the lower face 98 of the slider 22.

The roller spindle 100 thus constitutes a means of fixing the grasping head 20 on the slider 22.

Advantageously, the attachment point 88 of the distal end 106 of the return device 84 is arranged on the roller spindle 100, under the lower lug 96.

Preferably, the return device 84 is a spiral draw-spring which extends entirely under the lower face 98 of the slider 22, when the grasping head 20 occupies its retracted position.

Preferably, the proximal end section 108 of the slider 22 comprises a safety device constituted by a stop 110 which is able to cooperate with an associated surface 112 of the main body 72 of the supporting element 16 in order to determine the maximum extension travel of the grasping head 20 and which could act in the event of a fracture of the return device 84.

The stop 110 is here constituted by the cylindrical head of a screw which is arranged in the upper face 104 of the proximal end section 108 of the slider 22. Thus, the stop 110 is able to cooperate with the facing said surface 112 of the main body 72 of the supporting element 16.

The grasping head 20 comprises at its distal axial end a grasping clamp 114 able to grasp and carry preforms or containers.

The control mechanism of the grasping clamp 114, which can be produced according to the prior art, will not be described here.

Due to the overall production of the slider 22 as a single piece and to the cantilevered fixing of the grasping head 20 on the distal end section 89 of the slider 22, the grasping head 20 is fixed directly on the slider 22, with no intermediate part, which makes it possible to reduce the number of parts necessary and therefore to reduce the weight of the assembly formed by the grasping head 20 and the slider 22.

It is noted that the distal end section 89 of the slider 22 always extends on the distal side of the supporting element 16.

It is observed that the length of the transfer arm 14 according to the invention is not modified during its operation. In fact, the extension of the transfer arm 14 is caused solely by a shift of the slider 22 with respect to the swivelling axis A1 of the supporting element 16, which makes it possible in particular to minimize vibratory phenomena.

The arrangement of the return spring 84 under the lower face 98 of the slider 22 makes it possible to minimize the lateral dimension of the transfer arm 14, that is to say the dimension in a direction which is orthogonal to the direction BO and which is contained in a plane transverse to the axis of rotation AO of the support 12. In particular, the swivelling leg 76 can be arranged in the vicinity of the lateral faces of the slider 22.

Because of the screwed fitting of the swivelling spindle 18 in the spacer 50, it is possible to adjust the vertical position of the transfer arm 14 with respect to the support 12 easily.

In fact, by using an appropriate spanner which cooperates with the drive means 66 constituted by the flats arranged at the upper end of the swivelling spindle 18, it is possible to screw or to unscrew the swivelling spindle in the spacer 50, which causes an axial displacement of the swivelling spindle 18 with respect to the spacer 50.

When the vertical position of the swivelling spindle 18 is adjusted, it then suffices to tighten the nut constituting the locking means 64 against the spacer 50 in order to lock the swivelling spindle 18 in the spacer 50.

It is therefore possible to adjust the height of the transfer arm 14 on the support 12 without it being necessary to detach the transfer arm 14.

The invention claimed is:

1. Device (10) for conveying objects such as preforms and bottles, of the type comprising a rotating support (12) which is driven in rotation continuously about a substantially vertical axis of rotation (AO) and which carries a transfer arm (14), of the type in which the transfer arm (14) comprises a supporting element (16) which is mounted in a swivelling manner with respect to the rotating support (12), about a swivelling spindle (18) which is substantially parallel to the axis of rotation (AO) of the support (12), and a grasping head (20) which is able to support at last one object and which is mounted in a sliding manner with respect to the supporting element (16), in a direction (BO) approximately radial with respect to the axis of rotation (AO) of the support (12), between a proximal retracted position and a distal extended position with respect to the axis of rotation (AO), of the type in which the grasping head (20) is attached cantilevered on the distal end section (89) of a slider (22) sliding in a slide (24) fixed to the supporting element (16), and of the type comprising a first cam system and a second cam system for driving the grasping head (20) in its sliding and the supporting element (16) in its swivelling respectively, according to the angular position of the arm (14) about the axis of rotation (AO) of the support (12)

characterized in that the slide (24) comprises a downwardly open groove (25), in that the slider (22) is produced in one piece with the overall shape of a rail, the profile of the slider (22) being complementary to that of the profile of the groove (25) of the slide (24), such that the slider (22) is held vertically downwards by the slide (24) and its profile, and in that the supporting element (16) comprises a main cylindrical body (72) coaxial with the swivelling spindle (18), the slide (24) being fixed to the lower transverse face (74) of the main body (72).

2. Device (10) according to claim 1, characterized in that the first cam system comprises a first cam follower element (34) which is fixed to the distal end section (89) of the slider (22).

3. Device (10) according to claim 2, characterized in that the first cam follower element (34) is a roller called the extension roller which is mounted freely rotating on a roller spindle (100) substantially parallel with the axis of rotation (AO) of the support (12), and in that the roller spindle (100) is fixed on the distal end section (89) of the slider (22) through a lower lug (96) of the grasping head (20), in such a way as to constitute a means of fixing the grasping head (20) on the slider (22).

4. Device (10) according to claim 3, characterized in that the transfer arm (14) comprises a return device (84) which is interposed totally along the direction (BO) between the distal end section (89) of the slider (22) and the supporting element (16) in such a way as to return the grasping head (20) to its retracted position.

5. Device (10) according to claim 4, characterized in that the distal end (106) of the return device (84) is fixed on the roller spindle (100) carrying the extension roller (34).

6. Device (10) according to claim 4, characterized in that the supporting element (16) comprises a main body (72) which is provided with a swivelling leg (76) carrying at least one cam follower element (36, 38) which is part of the second cam system, and in that the proximal end (83) of the return device (84) is fixed on the swivelling leg (76).

7. Device (10) according to claim 4, characterized in that the return device (84) is a spiral draw-spring which extends entirely under the lower face (98) of the slider (22) in the retracted position.

8. Device (10) according to claim 1, characterized in that the grasping head (20) comprises an end lug (90) for fixing it to the distal end transverse face (92) of the slider (22) and a fixing screw (94) which is screwed into the distal end transverse face (92) of the slider (22) through the end lug (90).

9. Device (10) according to claim 1, characterized in that a proximal end section (108) of the slider (22) comprises a stop (110) which is able to cooperate with an associated surface (112) of the main body (72) of the supporting element (16) for determining the maximum extension travel of the grasping head (20).

10. Device (10) according to claim 1, characterized in that the supporting element (16) comprises a ball bearing (68) which receives the lower axial end (70) of the swivelling spindle (18) such that the supporting element (16) is mounted freely rotating about the swivelling spindle (18).

11. Device (10) according to claim 10, characterized in that the swivelling spindle (18) comprises a threaded intermediate section (60) which is screwed into a spacer (50) fixed to the rotating support (12) to allow height adjustment of the supporting element (16) with respect to the rotating support (12) and means (64) of locking the swivelling spindle (18) in an adjusted position with respect to the spacer (50).

12. Device (10) according to claim 11, characterized in that the upper axial end of the swivelling spindle (18) comprises a means (66) of driving the swivelling spindle (18) in rotation for the purpose of adjusting the height of the supporting element (16).

13. Device (10) according to claim 1, characterized in that the transfer arm (14) comprises a return device (84) which is interposed totally along the direction (BO) between the distal end section (89) of the slider (22) and the supporting element (16) in such a way as to return the grasping head (20) to its retracted position.

* * * * *